(12) United States Patent
Scaramuzzo et al.

(10) Patent No.: US 10,049,037 B2
(45) Date of Patent: Aug. 14, 2018

(54) DATA MANAGEMENT IN A STORAGE SYSTEM

(71) Applicant: SanDisk Enterprise IP LLC, Dallas, TX (US)

(72) Inventors: John Scaramuzzo, Pleasanton, CA (US); Bernardo Rub, Sudbury, MA (US); Robert W. Ellis, Phoenix, AZ (US); James Fitzpatrick, Sudbury, MA (US)

(73) Assignee: SanDisk Enterprise IP LLC, Dallas, TX (US)

( * ) Notice: Subject to any disclaimer, the term of this patent is extended or adjusted under 35 U.S.C. 154(b) by 315 days.

(21) Appl. No.: 14/105,002

(22) Filed: Dec. 12, 2013

(65) Prior Publication Data

US 2014/0304455 A1    Oct. 9, 2014

Related U.S. Application Data

(60) Provisional application No. 61/809,253, filed on Apr. 5, 2013.

(51) Int. Cl.
*G06F 12/00*    (2006.01)
*G06F 12/02*    (2006.01)

(52) U.S. Cl.
CPC .. *G06F 12/0246* (2013.01); *G06F 2212/7208* (2013.01)

(58) Field of Classification Search
CPC .......... G06F 12/0871; G06F 11/3447
See application file for complete search history.

(56) References Cited

U.S. PATENT DOCUMENTS 4,048,481 A    9/1977    Bailey, Jr. et al.
4,839,587 A    6/1989    Flatley et al.
(Continued)

FOREIGN PATENT DOCUMENTS

EP    1465203 A1    10/2004
EP    1 956 489 A2    8/2008
(Continued)

OTHER PUBLICATIONS

Barr, Introduction to Watchdog Timers, Oct. 2001, 3 pgs.
(Continued)

*Primary Examiner* — Kevin Verbrugge
*Assistant Examiner* — Arvind Talukdar
(74) *Attorney, Agent, or Firm* — Morgna, Lewis & Bockius LLP (57) ABSTRACT

A storage system, and a method of data management in the storage system, with non-volatile memory device characteristics determined during an inspection of non-volatile memory devices before a runtime operation of a storage device in the storage system including: a controller in the storage system: a drive-level control unit configured for an update of operational capabilities based on the non-volatile memory device characteristics during the runtime operation of the storage device and for a group of the non-volatile memory devices based on the operational capabilities; and a memory control unit, coupled to the drive-level control unit, the memory control unit configured to receive the operational capabilities for control of the non-volatile memory devices.

12 Claims, 4 Drawing Sheets

(56) References Cited

U.S. PATENT DOCUMENTS

| | | |
|---|---|---|
| 4,916,652 A | 4/1990 | Schwarz et al. |
| 5,034,744 A | 7/1991 | Obinata |
| 5,210,854 A | 5/1993 | Beaverton et al. |
| 5,311,395 A | 5/1994 | McGaha et al. |
| 5,450,354 A | 9/1995 | Sawada et al. |
| 5,479,638 A | 12/1995 | Assar et al. |
| 5,519,847 A | 5/1996 | Fandrich et al. |
| 5,530,705 A | 6/1996 | Malone |
| 5,537,555 A | 7/1996 | Landry |
| 5,551,003 A | 8/1996 | Mattson et al. |
| 5,657,332 A | 8/1997 | Auclair et al. |
| 5,666,114 A | 9/1997 | Brodie et al. |
| 5,708,849 A | 1/1998 | Coke et al. |
| 5,784,174 A | 7/1998 | Fujino et al. |
| 5,790,828 A | 8/1998 | Jost |
| 5,930,504 A | 7/1999 | Gabel |
| 5,943,692 A | 8/1999 | Marberg et al. |
| 5,949,785 A | 9/1999 | Beasley |
| 5,963,893 A | 10/1999 | Sakakura et al. |
| 5,982,664 A | 11/1999 | Watanabe |
| 6,000,006 A | 12/1999 | Bruce et al. |
| 6,016,560 A | 1/2000 | Wada et al. |
| 6,018,304 A | 1/2000 | Bessios |
| 6,034,897 A | 3/2000 | Estakhri et al. |
| 6,069,827 A | 5/2000 | Sinclair |
| 6,070,074 A | 5/2000 | Perahia et al. |
| 6,091,652 A | 7/2000 | Haehn et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,275,436 B1 | 8/2001 | Tobita et al. |
| 6,295,592 B1 | 9/2001 | Jeddeloh et al. |
| 6,311,263 B1 | 10/2001 | Barlow et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,678,788 B1 | 1/2004 | O'Connell |
| 6,728,913 B1 | 4/2004 | Parker |
| 6,757,768 B1 | 6/2004 | Potter et al. |
| 6,763,424 B2 | 7/2004 | Conley |
| 6,775,792 B2 | 8/2004 | Ulrich et al. |
| 6,778,387 B2 | 8/2004 | Fairchild |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,850,443 B2 | 2/2005 | Lofgren et al. |
| 6,854,070 B2 | 2/2005 | Johnson et al. |
| 6,871,257 B2 | 3/2005 | Conley et al. |
| 6,871,304 B2 | 3/2005 | Hadjihassan et al. |
| 6,895,464 B2 | 5/2005 | Chow et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,032,123 B2 | 4/2006 | Kane et al. |
| 7,043,505 B1 | 5/2006 | Teague et al. |
| 7,082,495 B2 | 7/2006 | DeWhitt et al. |
| 7,100,002 B2 | 8/2006 | Shrader et al. |
| 7,107,389 B2 | 9/2006 | Inagaki et al. |
| 7,111,293 B1 | 9/2006 | Hersh et al. |
| 7,139,864 B2 | 11/2006 | Bennett et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,233,497 B2 | 6/2007 | Simon et al. |
| 7,243,186 B2 | 7/2007 | Liang et al. |
| 7,298,888 B2 | 11/2007 | Hamar |
| 7,328,377 B1 | 2/2008 | Lewis et al. |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,558,109 B2 | 7/2009 | Brandman et al. |
| 7,571,277 B2 | 8/2009 | Mizushima |
| 7,574,554 B2 | 8/2009 | Tanaka et al. |
| 7,596,643 B2 | 9/2009 | Merry et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,681,106 B2 | 3/2010 | Jarrar et al. |
| 7,685,494 B1 | 3/2010 | Varnica et al. |
| 7,693,422 B2 | 4/2010 | Alicherry et al. |
| 7,707,481 B2 | 4/2010 | Kirschner et al. |
| 7,738,502 B2 | 6/2010 | Chang et al. |
| 7,743,216 B2 | 6/2010 | Lubbers et al. |
| 7,761,655 B2 | 7/2010 | Mizushima et al. |
| 7,774,390 B2 | 8/2010 | Shin |
| 7,818,525 B1 | 10/2010 | Frost et al. |
| 7,827,348 B2 | 11/2010 | Lee et al. |
| 7,830,164 B2 | 11/2010 | Earle et al. |
| 7,840,762 B2 | 11/2010 | Oh et al. |
| 7,853,749 B2 | 12/2010 | Kolokowsky |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich |
| 7,979,614 B1 | 7/2011 | Yang |
| 7,996,642 B1 | 8/2011 | Smith |
| 8,000,161 B2 | 8/2011 | Stan et al. |
| 8,001,135 B2 | 8/2011 | Perlmutter et al. |
| 8,006,161 B2 | 8/2011 | Lestable et al. |
| 8,010,738 B1 | 8/2011 | Chilton et al. |
| 8,028,123 B2 | 9/2011 | Kilzer et al. |
| 8,032,724 B1 | 10/2011 | Smith |
| 8,046,645 B2 | 10/2011 | Hsu et al. |
| 8,051,241 B2 | 11/2011 | Feldman et al. |
| 8,069,390 B2 | 11/2011 | Lin |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,190,967 B2 | 5/2012 | Hong et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |

(56) References Cited

U.S. PATENT DOCUMENTS

| | | |
|---|---|---|
| 8,254,172 B1 | 8/2012 | Kan |
| 8,254,181 B2 | 8/2012 | Hwang et al. |
| 8,259,506 B1 | 9/2012 | Sommer et al. |
| 8,289,801 B2 | 10/2012 | Smith et al. |
| 8,296,534 B1 | 10/2012 | Gupta et al. |
| 8,312,349 B2 | 11/2012 | Reche et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,412,985 B1 | 4/2013 | Bowers et al. |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,760 B2 | 10/2013 | Dhokia et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,725,931 B1 | 5/2014 | Kang |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,862,818 B1 | 10/2014 | Ozdemir |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 9,201,728 B2 | 12/2015 | Patapoutian et al. |
| 9,239,781 B2 | 1/2016 | Jones et al. |
| 2002/0024846 A1 | 2/2002 | Kawahara et al. |
| 2002/0056025 A1 | 5/2002 | Qiu et al. |
| 2002/0083299 A1 | 6/2002 | Van Huben et al. |
| 2002/0152305 A1 | 10/2002 | Jackson et al. |
| 2002/0156891 A1 | 10/2002 | Ulrich et al. |
| 2002/0159285 A1 | 10/2002 | Morley et al. |
| 2002/0162075 A1 | 10/2002 | Talagala et al. |
| 2002/0165896 A1 | 11/2002 | Kim |
| 2003/0033308 A1 | 2/2003 | Patel et al. |
| 2003/0041299 A1 | 2/2003 | Kanazawa et al. |
| 2003/0043829 A1 | 3/2003 | Rashid |
| 2003/0046603 A1 | 3/2003 | Harari et al. |
| 2003/0074592 A1 | 4/2003 | Hasegawa |
| 2003/0088805 A1 | 5/2003 | Majni et al. |
| 2003/0093628 A1 | 5/2003 | Matter et al. |
| 2003/0163633 A1 | 8/2003 | Aasheim et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0080985 A1 | 4/2004 | Chang et al. |
| 2004/0088511 A1 | 5/2004 | Bacon et al. |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0076102 A1 | 4/2005 | Chen et al. |
| 2005/0114587 A1 | 5/2005 | Chou et al. |
| 2005/0144516 A1 | 6/2005 | Gonzalez et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0039196 A1 | 2/2006 | Gorobets et al. |
| 2006/0053246 A1 | 3/2006 | Lee |
| 2006/0080505 A1 | 4/2006 | Arai et al. |
| 2006/0085671 A1 | 4/2006 | Majni et al. |
| 2006/0136570 A1 | 6/2006 | Pandya |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0156177 A1 | 7/2006 | Kottapalli et al. |
| 2006/0195650 A1 | 8/2006 | Su et al. |
| 2006/0253641 A1 | 11/2006 | Gatzemeier et al. |
| 2006/0256624 A1 | 11/2006 | Eggleston et al. |
| 2006/0259528 A1 | 11/2006 | Dussud et al. |
| 2006/0282644 A1 | 12/2006 | Wong |
| 2006/0294574 A1 | 12/2006 | Cha |
| 2007/0011413 A1 | 1/2007 | Nonaka et al. |
| 2007/0050536 A1 | 3/2007 | Kolokowsky |
| 2007/0058446 A1 | 3/2007 | Hwang et al. |
| 2007/0061511 A1 | 3/2007 | Faber |
| 2007/0061597 A1 | 3/2007 | Holtzman et al. |
| 2007/0067598 A1 | 3/2007 | Fujimoto |
| 2007/0076479 A1 | 4/2007 | Kim et al. |
| 2007/0079152 A1 | 4/2007 | Winick et al. |
| 2007/0081408 A1 | 4/2007 | Kwon et al. |
| 2007/0083697 A1 | 4/2007 | Birrell et al. |
| 2007/0083779 A1 | 4/2007 | Misaka et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1 | 8/2007 | Fujbayashi et al. |
| 2007/0208901 A1 | 9/2007 | Purcell et al. |
| 2007/0226592 A1 | 9/2007 | Radke |
| 2007/0234004 A1 | 10/2007 | Oshima et al. |
| 2007/0234143 A1 | 10/2007 | Kim |
| 2007/0245061 A1 | 10/2007 | Harriman |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2007/0277036 A1 | 11/2007 | Chamberlain et al. |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0077841 A1 | 3/2008 | Gonzalez et al. |
| 2008/0077937 A1 | 3/2008 | Shin et al. |
| 2008/0082736 A1 | 4/2008 | Chow et al. |
| 2008/0086677 A1 | 4/2008 | Yang et al. |
| 2008/0126720 A1 | 5/2008 | Danilak |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0183918 A1 | 7/2008 | Dhokia et al. |
| 2008/0189588 A1 | 8/2008 | Tanaka et al. |
| 2008/0229000 A1 | 9/2008 | Kim |
| 2008/0229003 A1 | 9/2008 | Mizushima et al. |

(56) References Cited

U.S. PATENT DOCUMENTS

| | | |
|---|---|---|
| 2008/0229176 A1 | 9/2008 | Arnez et al. |
| 2008/0263289 A1 | 10/2008 | Hosoya et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313505 A1 | 12/2008 | Lee et al. |
| 2009/0003058 A1 | 1/2009 | Kang |
| 2009/0006900 A1 | 1/2009 | Lastras-Montano et al. |
| 2009/0019321 A1 | 1/2009 | Radke |
| 2009/0037652 A1 | 2/2009 | Yu et al. |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0132756 A1 | 5/2009 | Hsieh |
| 2009/0138654 A1 | 5/2009 | Sutardja |
| 2009/0144598 A1 | 6/2009 | Yoon et al. |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0168525 A1 | 7/2009 | Olbrich et al. |
| 2009/0172248 A1 | 7/2009 | You |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0179707 A1 | 7/2009 | Higashino |
| 2009/0183183 A1* | 7/2009 | Muppirala ............ G06F 9/4411 719/327 |
| 2009/0193058 A1 | 7/2009 | Reid |
| 2009/0207660 A1 | 8/2009 | Hwang et al. |
| 2009/0222708 A1 | 9/2009 | Yamaga |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0296466 A1 | 12/2009 | Kim et al. |
| 2009/0296486 A1 | 12/2009 | Kim et al. |
| 2009/0300238 A1 | 12/2009 | Panabaker et al. |
| 2009/0319864 A1 | 12/2009 | Shrader |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0061151 A1 | 3/2010 | Miwa et al. |
| 2010/0082890 A1 | 4/2010 | Heo et al. |
| 2010/0103737 A1 | 4/2010 | Park |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0161936 A1 | 6/2010 | Royer et al. |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0199125 A1 | 8/2010 | Reche |
| 2010/0202196 A1 | 8/2010 | Lee et al. |
| 2010/0208521 A1 | 8/2010 | Kim et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0325340 A1 | 12/2010 | Feldman et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078295 A1* | 3/2011 | Kavuri ................ G06F 3/0605 709/222 |
| 2011/0078393 A1 | 3/2011 | Lin |
| 2011/0083060 A1 | 4/2011 | Sakurada et al. |
| 2011/0099342 A1 | 4/2011 | Ozdemir |
| 2011/0107144 A1 | 5/2011 | Ohara |
| 2011/0113281 A1 | 5/2011 | Zhang et al. |
| 2011/0131365 A1 | 6/2011 | Zhang et al. |
| 2011/0131444 A1 | 6/2011 | Buch et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0173378 A1 | 7/2011 | Filor et al. |
| 2011/0173395 A1* | 7/2011 | Bhattacharjee ........ G05D 23/19 711/135 |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0205823 A1 | 8/2011 | Hemink et al. |
| 2011/0209032 A1 | 8/2011 | Choi et al. |
| 2011/0213920 A1 | 9/2011 | Frost et al. |
| 2011/0228601 A1 | 9/2011 | Olbrich et al. |
| 2011/0231600 A1 | 9/2011 | Tanaka et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0023144 A1 | 1/2012 | Rub |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0057410 A1 | 3/2012 | Yu et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0110250 A1 | 5/2012 | Sabbag et al. |
| 2012/0124046 A1 | 5/2012 | Provenzano |
| 2012/0124273 A1 | 5/2012 | Goss et al. |
| 2012/0151253 A1 | 6/2012 | Horn |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0195126 A1 | 8/2012 | Roohparvar |
| 2012/0203951 A1* | 8/2012 | Wood .................... G11C 16/28 711/102 |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0239976 A1 | 9/2012 | Cometti et al. |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |

(56) References Cited

U.S. PATENT DOCUMENTS

| | | | |
|---|---|---|---|
| 2012/0311402 A1 | 12/2012 | Tseng et al. | |
| 2012/0317334 A1 | 12/2012 | Suzuki et al. | |
| 2012/0324191 A1 | 12/2012 | Strange et al. | |
| 2012/0331207 A1 | 12/2012 | Lassa et al. | |
| 2013/0007380 A1 | 1/2013 | Seekins et al. | |
| 2013/0007543 A1 | 1/2013 | Goss et al. | |
| 2013/0054881 A1 | 2/2013 | Ellis et al. | |
| 2013/0060004 A1 | 3/2013 | Higgins et al. | |
| 2013/0061019 A1 | 3/2013 | Fitzpatrick et al. | |
| 2013/0073788 A1 | 3/2013 | Post et al. | |
| 2013/0073797 A1 | 3/2013 | Chowdhury | |
| 2013/0074093 A1* | 3/2013 | Gounares | G06F 9/5016 718/104 |
| 2013/0080691 A1 | 3/2013 | Weingarten et al. | |
| 2013/0094289 A1 | 4/2013 | Sridharan et al. | |
| 2013/0100600 A1 | 4/2013 | Yin et al. | |
| 2013/0104005 A1 | 4/2013 | Weingarten et al. | |
| 2013/0124792 A1 | 5/2013 | Melik-Martirosian et al. | |
| 2013/0151753 A1 | 6/2013 | Jeon et al. | |
| 2013/0198436 A1 | 8/2013 | Bandic et al. | |
| 2013/0205102 A1 | 8/2013 | Jones et al. | |
| 2013/0219248 A1 | 8/2013 | Sakurai | |
| 2013/0232290 A1 | 9/2013 | Ish et al. | |
| 2013/0238833 A1 | 9/2013 | Vogan et al. | |
| 2013/0255825 A1 | 10/2013 | Lassa | |
| 2013/0297986 A1 | 11/2013 | Cohen | |
| 2013/0297988 A1 | 11/2013 | Wu et al. | |
| 2013/0304998 A1 | 11/2013 | Palmer | |
| 2013/0305093 A1 | 11/2013 | Jayachandran et al. | |
| 2013/0326116 A1* | 12/2013 | Goss | G06F 12/0871 711/103 |
| 2013/0332791 A1 | 12/2013 | Chu | |
| 2014/0036589 A1 | 2/2014 | Parthasarathy et al. | |
| 2014/0059359 A1 | 2/2014 | Bahirat | |
| 2014/0108891 A1 | 4/2014 | Strasser et al. | |
| 2014/0129874 A1 | 5/2014 | Zaltsman et al. | |
| 2014/0156966 A1 | 6/2014 | Ellis et al. | |
| 2014/0158525 A1 | 6/2014 | Greene | |
| 2014/0181370 A1 | 6/2014 | Cohen et al. | |
| 2014/0208174 A1 | 7/2014 | Ellis et al. | |
| 2014/0258769 A1 | 9/2014 | Baryudin et al. | |
| 2014/0372777 A1 | 12/2014 | Reller et al. | |
| 2015/0177999 A1 | 6/2015 | Gakhal et al. | |

FOREIGN PATENT DOCUMENTS

| | | |
|---|---|---|
| EP | 1 990 921 A2 | 11/2008 |
| EP | 2 498 259 A2 | 9/2012 |
| JP | 2002-532806 | 10/2002 |
| JP | 2012129859 A | 7/2012 |
| WO | WO 2011/156466 A2 | 12/2001 |
| WO | WO 2007/036834 | 4/2007 |
| WO | WO 2007/080586 | 7/2007 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/042298 A1 | 4/2009 |
| WO | WO 2009/058140 | 5/2009 |
| WO | WO 2009/084724 | 7/2009 |
| WO | WO 2009/111174 | 9/2009 |
| WO | WO 2009/134576 | 11/2009 |

OTHER PUBLICATIONS

Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology—AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
Pliant Technology, International Search Report / Written Opinion, PCT/US08/88133, dated Mar. 19, 2009, 7 pgs.
Pliant Technology, International Search Report / Written Opinion, PCT/US08/88136, dated Mar. 19, 2009, 7 pgs.
Pliant Technology, International Search Report / Written Opinion, PCT/US08/88146, dated Feb. 26, 2009, 10 pgs.
Pliant Technology, International Search Report / Written Opinion, PCT/US08/88154, dated Feb. 27, 2009, 8 pgs.
Pliant Technology, International Search Report / Written Opinion, PCT/US08/88164, dated Feb. 13, 2009, 6 pgs.
Pliant Technology, International Search Report / Written Opinion, PCT/US08/88206, dated Feb. 18, 2009, 8 pgs.
Pliant Technology, International Search Report / Written Opinion, PCT/US08/88217, dated Feb. 19, 2009, 7 pgs.
Pliant Technology, International Search Report / Written Opinion, PCT/US08/88229, dated Feb. 13, 2009, 7 pgs.
Pliant Technology, International Search Report / Written Opinion, PCT/US08/88232, dated Feb. 19, 2009, 8 pgs.
Pliant Technology, International Search Report / Written Opinion, PCT/US08/88236, dated Feb. 19, 2009, 7 pgs.
Pliant Technology, International Search Report / Written Opinion, PCT/US2011/028637, dated Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, dated Aug. 31, 2012, 12 pgs.
SanDisk Enterprise IP LLC, International Search Report / Written Opinion, PCT/US2012/042771, dated Mar. 4, 2013, 14 pgs.
SanDisk Enterprise IP LLC, International Search Report / Written Opinion, PCT/US2012/042775, dated Sep. 26, 2012, 8 pgs.
SanDisk Enterprise IP LLC, International Search Report / Written Opinion, PCT/US2012/059447, dated Jun. 6, 2013, 12 pgs.
SanDisk Enterprise IP LLC, International Search Report / Written Opinion, PCT/US2012/059453, dated Jun. 6, 2013, 12 pgs.
SanDisk Enterprise IP LLC, International Search Report / Written Opinion, PCT/US2012/059459, dated Feb. 14, 2013, 9 pgs.
SanDisk Enterprise IP LLC, International Search Report / Written Opinion, PCT/US2012/065914, dated May 23, 2013, 7 pgs.
SanDisk Enterprise IP LLC, International Search Report / Written Opinion, PCT/US2012/065916, dated Apr. 5, 2013, 7 pgs.
SanDisk Enterprise IP LLC, International Search Report / Written Opinion, PCT/US2012/065919, dated Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, dated Apr. 18, 2012, 12 pgs.
SanDisk Enterprise IP LLC, Office Action, CN 200880127623.8, dated Dec. 31, 2012, 9 pgs.
SanDisk Enterprise IP LLC, Office Action, JP 2010-540863, dated Jul. 24, 2012, 3 pgs.
Watchdog Timer and Power Savin Modes, Microchip Technology Inc., 2005, 14 pgs.

(56) References Cited

OTHER PUBLICATIONS

Zeidman, 1999 Verilog Designer's Library, 9 pgs.
Cooke, "Introduction to Flash Memory (T1A)," Flash Memory Summit, Aug. 22, 2008, Micron Technology, Inc., 102 pages.
Gal et al., "Algotithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
International Search Report and Written Opinion dated Dec. 20, 2013, received in PCT/US2013/045282, which corresponds to U.S. Appl. No. 13/493,949, 7 pages (Ellis).
International Search Report and Written Opinion dated Jun. 12, 2014, received in PCT/US2014/018972, which corresponds to U.S. Appl. No. 13/779,352, 12 pages (Schmier).
International Search Report and Written Opinion dated May 14, 2014, received in International Patent Application No. PCT/US2014/017168, which corresponds to U.S. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
Ulinktech, "ATA Command Table (in Alphabetic Ordler)," Feb. 6, 2011, https.web.archive.org/web/20110206060820/http://www.ulinktech.com/downloads/AT, 6 pages.
International Search Report and Written Opinion dated Aug. 22, 2014, received in International Patent. Application No. PCT/US2014/032978, which corresponds to U.S. Appl. No. 14/081,992, 10 pages (Ellis).
International Search Report dated Mar. 25 2014, received in International Patent Application No. PCT/US2013/072400, which corresponds to U.S. Appl. No. 13/690,337, 3 pages (Ellis).
Invitation to Pay Additional Fees dated Jul. 25, 2014, received in International Patent Application No. PCT/US2014/021290, which corresponds to U.S. Appl. No. 13/791,797, 8 pages (Dean).
International Search Report and Written Opinion dated Jul. 31, 2014, received in International Patent Application No. PCT/US2014/031465, which corresponds to U.S. Appl. No. 13/851,928, 13 pages (Ellis).
International Search Report and Written Opinion dated July 31, 2014, received in International Patent Application No. PCT/US2014/033876, which corresponds to U.S. Appl. No. 13/861,326, 9 pages (Fitzpatrick).
International Search Report and Written Opinion dated Nov. 7, 2014, received in International Patent Application No. PCT/US2014/049732, which coresponds to U.S. Appl. No. 14/334,350, 13 pages (Fitzpatrick).
International Search Report and Written Opinion dated Oct. 17, 2014, received in International Patent Application No. PCT/US2014/049734, which corresponds to U.S. Appl. No. 14/332,259, 8 pages (Higgins).
International Search Report and Written Opinion dated Oct. 23, 2014, received in International Patent Application No. PCT/US2014/049736, which corresponds to U.S. Appl. No. 14/446,249 8 pages (Fitzpatrick).
Internatlonal Search Report and Written Opinion dated Nov. 5 2014, received in International Patent Application No. PCT/US2014/049282, which corresponds to U.S. Appl. No. 13/957,407,12 pages (Fitzpatrick).
Narayanan et al., "Migrating Server Storage to SSDs: Analysis of Tradeoffs," Computer Systems, Apr. 2009, 12 pages.
Shiraz et at, "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Tseng et at , "Understanding the Impact of Power Loss on Flash Memory," DAC'11, Jun. 5-10, 2011, San Diego, California, 6 pages.
Yimo et al., "WeLe-RAID: A SSD-Based RAID for System Endurance and Performance," Jan. 2011, Network and Parallel Computing, Springer, 14 pages.
International Search Report and Written Opinion dated Jan. 9, 2015, received in International Patent Application No. PCT/US2014/049731, which corresponds to U.S. Appl. No. 14/334,324, 9 pages (Fitzpatrick).
International Search Report and Written Opinion dated Feb. 18, 2015, received in International Patent Application No. PCT/US2014/065401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).
Online Merriam Webster Dictionary, definition of "Distinct" from Jun. 12, 2011, https://web.archive.org/web/20110612181129/http://www2.merriam-webstercom/cgi-bin/mwdictadu?book=Dictionary&va=distinct.

* cited by examiner

DATA MANAGEMENT IN A STORAGE SYSTEM

CROSS-REFERENCE TO RELATED APPLICATION(S)

This application claims the benefit of U.S. Provisional Patent Application Ser. No. 61/809,253 filed Apr. 5, 2013, which is incorporated herein by reference in its entirety.

TECHNICAL FIELD

The present invention relates generally to a storage system and more particularly to data management in a storage system.

BACKGROUND ART

Various forms of long-term storage in computer systems include, other than electromechanical hard disks, non-volatile storage rooted in semiconductor or other memory technology. NOT-AND (NAND) flash memory is one form of non-volatile memory used in solid-state storage devices. In a common configuration of flash memory, the memory cells are arranged in typical row and column fashion with circuitry for accessing individual cells. The data store elements (e.g., transistors) of those memory cells are configured to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is endurance because it can tolerate only a limited number of operations over a given period of operational life of a storage system and as a result has a limited life.

Thus, a need still remains for better data management devices that can optimize operations and prolong the life of storage devices. In view of the ever-increasing commercial competitive pressures, along with growing consumer expectations and the diminishing opportunities for meaningful product differentiation in the marketplace, it is important to find answers for these problems.

Prior developments have long sought but not found optimal solutions to these problems. Hence, there remains a need that has long eluded those skilled in the art.

SUMMARY

The present disclosure covers various embodiments of a storage system and a method of data management in the storage system. In one implementation, the storage system includes a controller for updating operational capabilities to control non-volatile memory devices. The operational capabilities are updated based on non-volatile memory device characteristics during a runtime operation of a storage device in the storage system. For example, the operational capabilities include but not limited to retention measurements, endurance measurements, or bit error rate (BER). The non-volatile memory device characteristics associated with the non-volatile memory devices are obtained during an inspection of the non-volatile memory devices that occurs before the runtime operation of the storage device.

Certain embodiments have other steps or elements in addition to or in place of those mentioned above. The steps or elements will become apparent to those skilled in the art from a reading of the following detailed description when taken with reference to the accompanying drawings. The embodiments described herein are illustrative and should not limit the scope of the claimed invention as recited in the claims.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system may be drawn not to scale.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

Various embodiments described here include a new approach for data management of endurance in a storage system. This approach includes a method of data management based on non-volatile memory device characteristics determined during an inspection of non-volatile memory devices before a runtime operation of a storage device in a storage system including: performing by a controller in the storage system: updating operational capabilities based on the non-volatile memory device characteristics during the runtime operation of the storage device; grouping the non-volatile memory devices based on the operational capabilities; and receiving the operational capabilities for controlling the non-volatile memory devices.

Various embodiments described here also include a storage system with non-volatile memory device characteristics determined during an inspection of non-volatile memory devices before a runtime operation of a storage device in the storage system including: a controller in the storage system: a drive-level control unit configured for an update of operational capabilities based on the non-volatile memory device characteristics during the runtime operation of the storage device and for a group of the non-volatile memory devices based on the operational capabilities; and a memory control unit, coupled to the drive-level control unit, the memory control unit configured to receive the operational capabilities for control of the non-volatile memory devices.

The current state of technology does not address problems solved by the embodiments described herein. The problems are related to drives that are built with specific device types and there is no selection of feed forward process that is used to group devices or align a group of devices with individual or groups of storage devices.

The problems are also related to current drive firmware algorithms that are for the most part static in nature. One of the typical methods for the reuse of erase blocks in the algorithms is a "round robin" scheme. Additionally, some firmware using the algorithms keep "short lists" of erase blocks that can be free or available for reuse based on a simple list. These simple algorithms have a tendency to overuse a small subset of the total of erase blocks that are available. The erase blocks in the subset are used until they eventually fail and are taken out of a pool of available erase blocks.

The term "erase block" referred to herein is defined as a group of pages, which is the smallest number of pages that are erased at one time. The term "page" referred to herein is defined as a memory component that is programmed as an individual unit. The page is a smallest group of data bytes that are read from or written to in an erase block.

Figure 1:
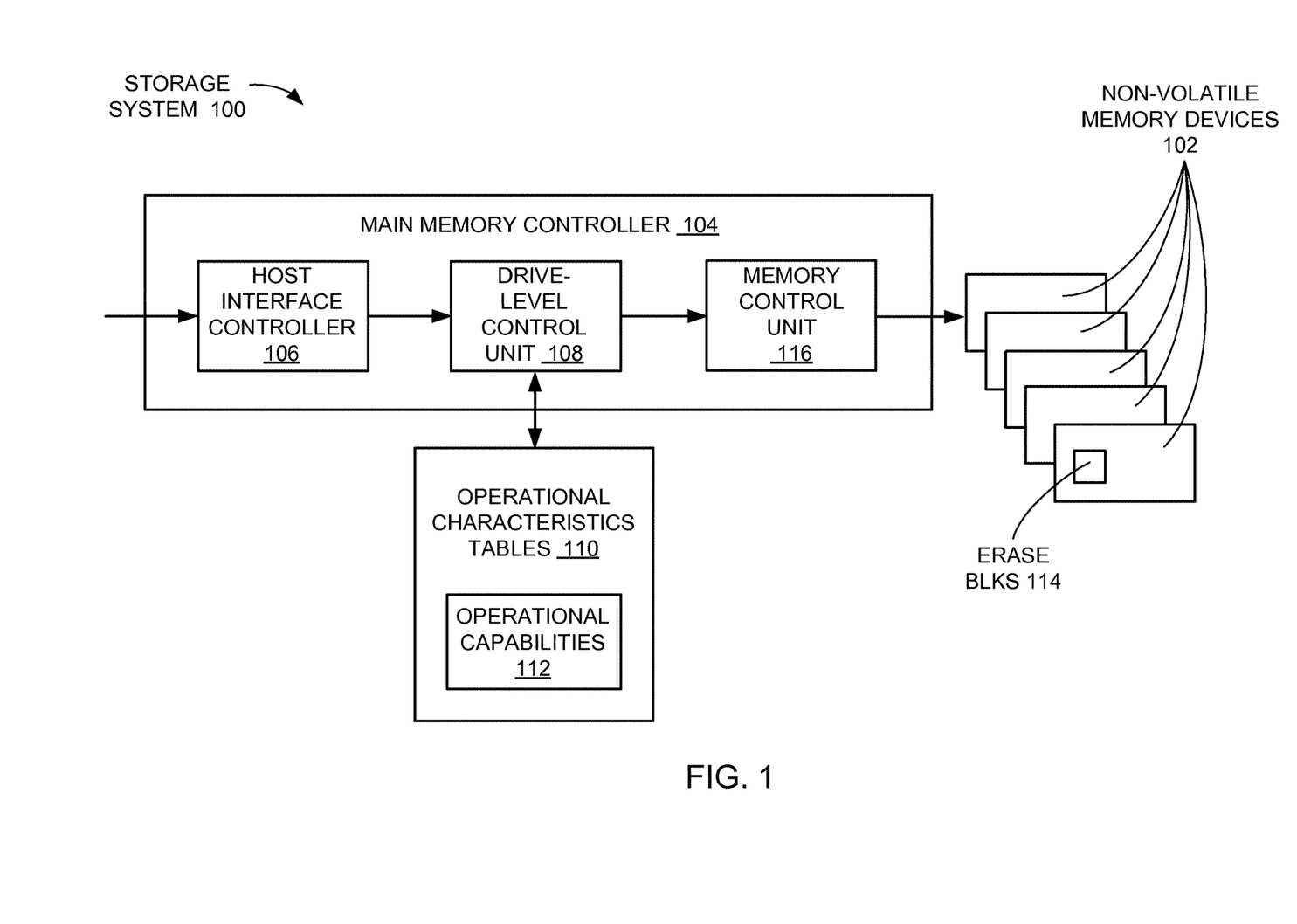
FIG. 1 is a storage system with data management in an embodiment of the present invention.

Referring now to FIG. 1, therein is shown a storage system 100 with data management in an embodiment of the present invention. The storage system 100 includes a mechanism for an intelligent flash management. FIG. 1 depicts a high-level architecture diagram of a storage device using characterization data associated with non-volatile memory devices 102 at runtime.

This concept can be constructed and used in a solid state drive (SSD) under development. This concept can also be retrofitted into almost any SSD product with a design that requires a process to recover data after long retention times or an increase in data integrity at boot time. Functions or operations of the storage system 100 can be implemented in modules.

The term "retention" referred to herein is defined as an ability of memory cells to retain the programmed or correct information. Retention refers to an amount of correct data after a given period, which is a time when a drive is powered, not powered, or a combination thereof.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

The storage system 100 includes a main memory controller 104. The main memory controller 104 includes a host interface controller 106 for interfacing and interacting with a host system (not shown). The main memory controller 104 includes a drive-level control unit 108 for interfacing with the host interface controller 106 and providing the intelligence of the main memory controller 104.

The drive-level control unit 108 controls or manages data stored in operational characteristics tables 110, which are information used to keep a record of capabilities of each memory component or a portion of the memory component. The drive-level control unit 108 evaluates operational capabilities 112 stored in the operational characteristics tables 110.

The drive-level control unit 108 dynamically updates the operational capabilities 112. The drive-level control unit 108 accesses the operational characteristics tables 110 that are updated with the operational capabilities 112. For example, the term "dynamically" can refer to updates that are non-static including continuous, periodical, or triggered by an event.

The drive-level control unit 108 can dynamically evaluate the operational capabilities 112. The drive-level control unit 108 can dynamically evaluate the operational capabilities 112 by dynamically determining values or states of the operational capabilities 112 at predetermined intervals or times throughout the operation of the non-volatile memory devices 102.

The values or states of the operational capabilities 112 are dynamically determined as opposed to being statically determined at a predetermined time or the beginning of the operation of the non-volatile memory devices 102 after power up.

The operational capabilities 112 are information of or associated with the non-volatile memory devices 102. The operational capabilities 112 include information used to identify the non-volatile memory devices 102 or portions of the non-volatile memory devices 102. The operational capabilities 112 include information associated with current states of erase blocks 114 in the non-volatile memory devices 102 or how the erase blocks 114 are currently used.

The operational capabilities 112 include measurement information associated with the erase blocks 114 of the non-volatile memory devices 102 and used to control or manage the non-volatile memory devices 102. The operational capabilities 112 include information associated with current states and capabilities of the erase blocks 114 as well as information that indicate how the erase blocks 114 are to be used. The operational capabilities 112 are stored as entries in the operational characteristics tables 110.

The main memory controller 104 includes a memory control unit 116 for interfacing with the drive-level control unit 108 and enabling external communication to and from the main memory controller 104. The memory control unit 116 communicates with the non-volatile memory devices 102.

The drive-level control unit 108 accesses the operational characteristics tables 110 to retrieve and send the operational capabilities 112 to the memory control unit 116 to control or manage the non-volatile memory devices 102. The drive-level control unit 108 can also generate control information based on the operational capabilities 112 and send the control information to the memory control unit 116 to control or manage the non-volatile memory devices 102.

Figure 2:
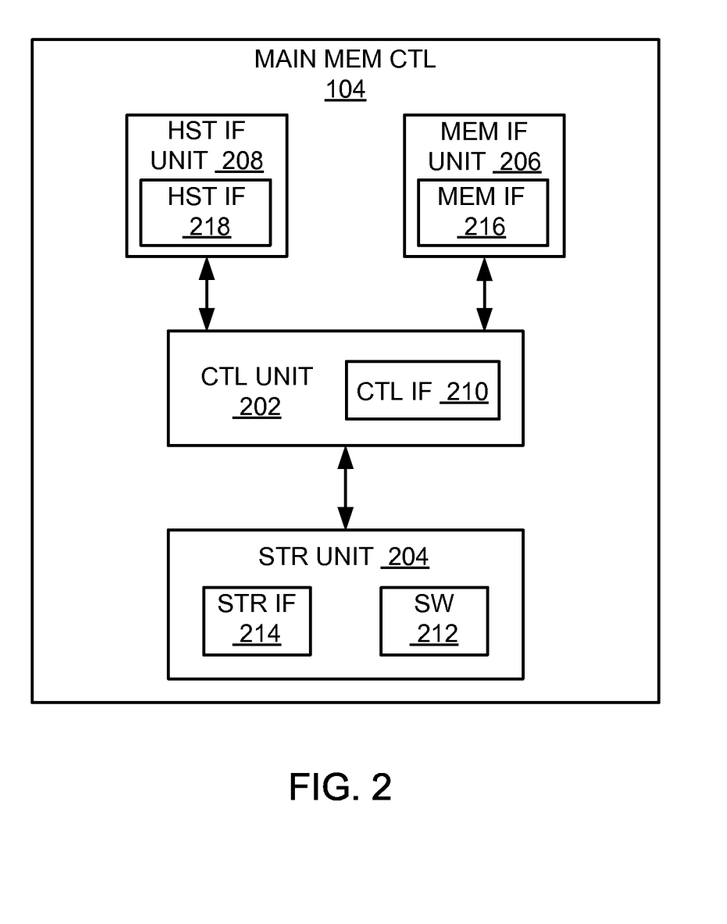
FIG. 2 is an exemplary hardware block diagram of the main memory controller.

Referring now to FIG. 2, therein is shown an exemplary hardware block diagram of the main memory controller 104. The main memory controller 104 includes the host interface controller 106 of FIG. 1, the drive-level control unit 108 of FIG. 1, the memory control unit 116 of FIG. 1, and the operational characteristics tables 110 of FIG. 1.

The main memory controller 104 can include a control unit 202, a storage unit 204, a memory interface unit 206, and a host interface unit 208. The control unit 202 can include a control interface 210. The control unit 202 can execute a software 212 stored in the storage unit 204 to provide the intelligence of the main memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the main memory controller 104. The control interface 210 can also be used for communication that is external to the main memory controller 104.

The control interface 210 can receive information from the other functional units or from external sources, or can transmit information to the other functional units or to external destinations. The external sources and the external destinations refer to sources and destinations external to the main memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the main memory controller 104. The storage interface 214 can receive information from the other functional units or from external sources, or can transmit information to the other functional units or to external destinations. The external sources and the external destinations refer to sources and destinations external to the main memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the main memory controller 104. For example, the memory interface unit 206 can permit the main memory controller 104 to communicate with the non-volatile memory devices 102 of FIG. 1.

The memory interface unit 206 can include a memory interface 216. The memory interface 216 can be used for communication between the memory interface unit 206 and other functional units in the main memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system (not shown) to interface and interact with the main memory controller 104. The host interface unit 208 can include a host interface 218 to provide communication mechanism between the host interface unit 208 and the host system.

The control unit 202 can operate the host interface unit 208 to send control or status information generated by the main memory controller 104 to the host system. The control unit 202 can also execute the software 212 for the other functions of the main memory controller 104. The control unit 202 can further execute the software 212 for interaction with the non-volatile memory devices 102 via the memory interface unit 206.

The functional units in the main memory controller 104 can work individually and independently of the other functional units. For illustrative purposes, the main memory controller 104 is described by operation of the main memory controller 104 with the host system and the non-volatile memory devices 102. It is understood that the main memory controller 104, the host system, and the non-volatile memory devices 102 can operate any of the modules and functions of the main memory controller 104.

Figure 3:
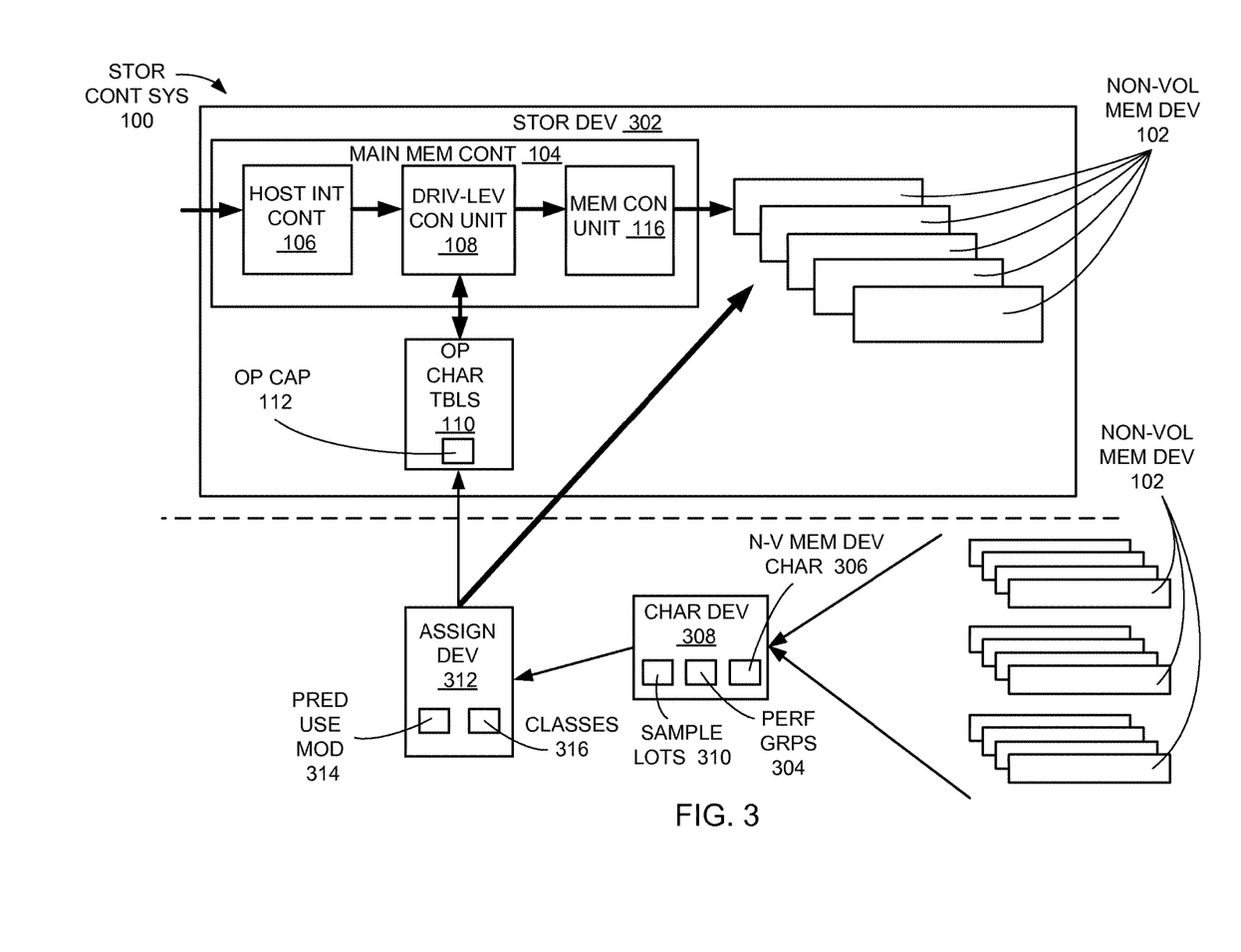
FIG. 3 is an exemplary storage device architecture with a linked manufacturing process.

Referring now to FIG. 3, therein is shown an exemplary storage device architecture with a linked manufacturing process. The manufacturing process is depicted below a dash line in FIG. 3. The embodiments described herein combine an ability to characterize components including the non-volatile memory devices 102 during the manufacturing process and during operations of storage devices 302 with the non-volatile memory devices 102. One of the storage devices 302 is depicted in FIG. 3. Portions of the storage devices 302 have been described above in FIG. 1.

Measurements from the characterization of the non-volatile memory devices 102 are used to improve performance and reliability of the storage device with the non-volatile memory devices 102. In addition to the characterization from the manufacturing process, the embodiments described herein also take into account grouping and regrouping of the non-volatile memory devices 102 based on runtime data or the operational capabilities 112.

The term "regroup" refers to changing assignment of the non-volatile memory devices 102 to the storage devices 302. For example, in a regrouping process, the non-volatile memory devices 102 that were used to build or assign to one of the storage devices 302 can be assigned to another of the storage devices 302, depending on the operational capabilities 112 of the non-volatile memory devices 102 as the storage devices 302 age. Also for example, any number of the non-volatile memory devices 102 that were used to build or assign to one of the storage devices 302 may still be assigned to the one of the storage devices 302.

The term "age" referred to herein indicates how long a storage system or a memory component has existed or has been in operations. For example, the age can be based on a number of erase cycles, how long it has been since the last time an erase block was written, an average BER an erase block is yielding, a temperature at which a device has been run, or a combination thereof.

FIG. 3 depicts the main memory controller 104 having the host interface controller 106 for interfacing with the host system (not shown) and the drive-level control unit 108 for controlling and managing the data stored in the operational characteristics tables 110. The main memory controller 104 includes the memory control unit 116 for interfacing with the non-volatile memory devices 102.

The storage system 100 includes a number of functions. One of the functions is to assemble drives or the storage devices 302 with memory components or the non-volatile memory devices 102 that have been sorted into performance groups 304, which are identified based on non-volatile memory device characteristics 306 of the non-volatile memory devices 102. The non-volatile memory device characteristics 306 are measured by a characterization device 308.

The term "non-volatile memory device characteristics" referred to herein refers to generally how a device performs a function as required by a storage device. For example, the non-volatile memory device characteristics include but not limited to retention measurements, endurance measurements, BER, and any other measurements. The term "endurance" referred to herein is defined as a number of operations a memory device tolerates over a given period of operational life of a storage system.

The non-volatile memory devices 102 are sorted into the performance groups 304 by the characterization device 308. The performance groups 304 can be identified based on and during incoming inspections of the non-volatile memory devices 102.

The incoming inspections occur before runtime operations of the storage devices 302 and the non-volatile memory devices 102. The term "runtime" refers to a period after the manufacturing process, a power-up cycle, and a configuration period. For example, the runtime can refer to the storage devices 302 and the non-volatile memory devices 102.

The incoming inspections can be performed on the non-volatile memory devices 102 for lot codes from certain predetermined wafers. The lot codes of sample lots 310 can be inspected. In these lots, a predetermined number of parts or the non-volatile memory devices 102 can be inspected. The sample lots 310 can represent incoming device lots to be tested and sorted. For example, 10 out of every 1000 parts in each of the sample lots 310 can be inspected.

A characterization test in the manufacturing process can be performed by the characterization device 308 for each of the sample lots 310 to find out or determine the non-volatile memory device characteristics 306. The non-volatile memory device characteristics 306 can include an average BER associated with the non-volatile memory devices 102 that are being measured. The characterization test can be used to determine where the mean of the non-volatile memory device characteristics 306 fits.

The term "bit error rate" (BER) referred to herein is defined as a number of incorrect bits in a data stream stored in a memory device. The BER can be detected within a code word protected by error correction code (ECC). The term "code word" referred to herein is defined as a group of data bytes covered by a single of multiple error correction code (ECC) parity words. The term "error correction code" (ECC) referred to herein is defined as parity data generated over a set of data grouped into a code word.

The non-volatile memory devices 102 can be of a category associated with their average BER. For example, an average BER can be determined for each of the sample lots 310. As a specific example, an average BER of one of the sample lots 310 can be $1 \times 10^{-3}$ after 10,000 P/E cycles in one of the performance groups 304. In this example, another average BER of another of the sample lots 310 can be $2 \times 10^{-3}$ after 10,000 P/E cycles in another of the performance groups 304, whereby the average BER and the another average BER are different from each other.

The term "program/erase cycle" (P/E cycle) referred to herein is defined as a base level operation of how data is replaced within an erase block. For example, a memory device including NAND and other memory types can have a limited number of useful P/E cycles.

Therefore, for incoming inspections, a group as a whole, referred to by the lot codes or groups of devices, would have certain performance characteristics. When the non-volatile memory devices 102 are classified in general, whether by groups or by individual characteristics, decisions can be made by an assignment device 312 on that classification of how to assemble drives.

The assignment device 312 performs a device-to-drive assignment or device selection by selecting which of the non-volatile memory devices 102 are to be assigned to the storage devices 302 based on the results of the characterization process performed by the characterization device 308. The results of the characterization process can include the non-volatile memory device characteristics 306 of the non-volatile memory devices 102.

The non-volatile memory device characteristics 306 can be provided by the assignment device 312 to the drive-level control unit 108 to update the operational capabilities 112 in the operational characteristics tables 110. The non-volatile memory device characteristics 306 are specific device characterization parameters. The operational capabilities 112 are updated at predetermined intervals during the runtime operations of the storage devices 302.

Another of the functions is to select sorted memory devices or the non-volatile memory devices 102 that have been sorted for drive assembly based on a predicted use model 314 for the drive or the storage devices 302. In the embodiments described herein, the term "sort" refers to selection of memory devices.

As an example, the non-volatile memory devices 102 can be sorted or selected by intermixing two different sample lots together to determine the non-volatile memory device characteristics 306. In this example, the non-volatile memory devices 102 can be selected using components that are creams of the crop or best of the best components in the two different sample lots based on their non-volatile memory device characteristics.

The predicted use model 314 includes information associated with classes 316 that indicate how memory components are used. The non-volatile memory devices 102 can be sorted or selected in a factory and they are going to be graded into different scales or the classes 316. For example, the predicted use model 314 can be associated with the classes 316, which indicates how the non-volatile memory devices 102 are used. The classes 316 indicate that the non-volatile memory devices 102 are applicable for write mostly accesses, read mostly accesses, large sequential accesses, and highly random accesses.

One of the classes 316 includes applications with the write mostly accesses where a drive is doing numerous data recording operations. The write mostly accesses are operations for writing data to memory devices, whereby a number of the operations is greater than a predetermined threshold. For example, the drive represents a back-up device. Most of the time, the drive is used for backing a computer up to store data to a storage device. The data backed up to the storage device is almost never read because it is not needed most of the time until data recovery occurs. So, the applications with the write mostly accesses are where the host system is mostly recording data onto the drive.

Another of the classes 316 includes applications with the read mostly accesses where a drive is doing numerous data retrieval operations. The read mostly accesses are operations for reading data from memory devices, whereby a number of the operations is greater than a predetermined threshold. For example, the applications with the read mostly accesses are used for a Global Positioning System (GPS) device with a database of street maps. As a specific example, a device in a car is not programmed very often, and the device is reading its internal memory constantly for database information.

Another of the classes 316 includes applications that need the large sequential accesses, which occur during actual data transfers that are either reading or writing to the drive in large contiguous transfer blocks. The large sequential accesses are operations for reading or writing data in contiguous blocks from or to memory devices, whereby a size of each of the contiguous blocks is greater than a predetermined threshold. For example, a couple megabytes of data can be transferred at a time. Also for example, one of the applications is reading movies off a disk drive for an airplane entertainment system. The reading process includes large-block sequential transfers because data of the movies has been contiguously stored in the disk drive.

Another of the classes 316 includes applications with the highly random accesses. The highly random accesses are operations for reading or writing data in non-sequential blocks from or to memory devices, whereby a size of each of the non-sequential blocks is less than a predetermined threshold. If a search is performed, a drive can access many portions all over a database to assemble search information. The search would thus involve the highly random accesses.

Another of the functions is to integrate a classification process into a design of a control firmware for the storage device. The classification process is a sorting or selection process of the non-volatile memory devices 102. The classification process can be implemented in the drive-level control unit 108. For example, the drive-level control unit 108 can include modules for performing the classification process. Also for example, the classification process can be performed based on the performance groups 304 or the predicted use model 314.

Another of the functions is to provide a component classification that is used to construct each individual drive. The component classification is the classification process for selecting the non-volatile memory devices 102.

Another of the functions is to provide the manufacturing process that is established to assign classified memory devices with individual and the classes 316 of storage devices or the non-volatile memory devices 102. The classified memory devices are the non-volatile memory devices 102 that have been selected based on the manufacturing process.

The classes 316 of the storage devices can be determined based on intake inspections or the incoming inspections. Groups of the non-volatile memory devices 102 can be determined based on certain aspects or the non-volatile memory device characteristics 306 of the non-volatile memory devices 102. The non-volatile memory devices 102 can be measured to determine the non-volatile memory device characteristics 306 of the non-volatile memory devices 102.

The non-volatile memory device characteristics 306 can be determined based on any number of device parameters. The non-volatile memory device characteristics 306 can be used to determine that the groups of the non-volatile memory devices 102 are good parts for retention, endurance, or any other purposes. For example, the device parameters can be determined by measuring BER, erase times, write times, or any other device parameters of the non-volatile memory devices 102.

In addition, the non-volatile memory device characteristics 306 that are individually specific to each of the non-volatile memory devices 102 within the groups might be important. For example, the non-volatile memory device characteristics 306 that are individually specific to each of the non-volatile memory devices 102 can include absolute timing latency.

Another of the functions is to group or regroup components of the non-volatile memory devices 102 having the non-volatile memory device characteristics 306 that are similar to or substantially the same with each other during the normal runtime operations of the storage devices 302 as the drive or the storage devices 302 age. One of ordinary skill in the art would know how to determine "substantially the same". After the non-volatile memory devices 102 are grouped by the assignment device 312, the non-volatile memory devices 102 can be regrouped based on the operational capabilities 112, the performance groups 304, the predicted use model 314, or a combination thereof during the runtime operations of the storage devices 302.

Firstly, the non-volatile memory devices 102 are selected based on the performance groups 304 before the normal runtime operations of the storage devices 302 and the non-volatile memory devices 102. This provides an overall grouping performance of the drive.

Then, as the drive ages, the operational capabilities 112 are continuously updated in the operational characteristics tables 110 at predetermined intervals. The non-volatile memory devices 102 are regrouped based on the operational capabilities 112. The non-volatile memory devices 102 are regrouped during the runtime operations as the drive ages. For example, the operational characteristics tables 110 are updated by estimating how fast individual devices or each of the non-volatile memory devices 102 is aging, since a number of the non-volatile memory devices 102 can fade or age faster than others.

Another of the functions is to determine an operation of drives in a group that takes advantage of aggregate capabilities of all components, such as the non-volatile memory devices 102, on the drives or in a population of the components used during the manufacturing process.

The functions described above provide a process, implemented in the assignment device 312, that is used to build drives or the storage devices that are different from each other for specific applications or purposes. For example, the process is used to build a group of the drives with the components or the non-volatile memory devices 102 that are more capable and another group of the drives with the components that are less capable. The functions described above also provide a process that is used to build the drives that use a predetermined wide range of component characteristics or the non-volatile memory device characteristics 306 to help smooth the performance and operations over a population of the drives.

The functions described above are used to build drives for specific purposes or applications based on sorting or selecting characterized devices based on the classes 316 including the read mostly accesses or data logging for drives using the write mostly accesses. The classes 316 can be determined based on materials that are used to build the non-volatile memory devices 102 including NAND can be better for one type of applications than other applications.

The main point of the embodiments described herein is that the non-volatile memory devices 102 are selected characterization wise by the characterization device 308. The non-volatile memory devices 102 are selected based on the non-volatile memory device characteristics 306 during the incoming inspections, which occur before the runtime operations of the non-volatile memory devices 102 or a drive. The assignment device 312 then assigns the non-volatile memory devices 102 to the storage devices 302.

The main point also includes that while the non-volatile memory devices 102 are being used on the drive or the storage devices 302, the non-volatile memory devices 102 are regrouped by the drive-level control unit 108 based on the operational capabilities 112 of the non-volatile memory devices 102. The non-volatile memory devices 102 are continuously regrouped or reformed into groups of the non-volatile memory devices 102 to form or for the storage devices 302 at predetermined intervals for managing the non-volatile memory devices 102 including flash devices to get better or improved aging, endurance, and reliability of the storage devices 302. In other words, the non-volatile memory devices 102 are not all treated or determined to be identical as they are being used during the runtime operations.

Functions or operations of the main memory controller 104 in the storage system 100 as described above can be implemented using modules. The functions or the operations of the main memory controller 104 can be implemented in hardware, software, or a combination thereof. For example, the host interface controller 106, the drive-level control unit 108, the memory control unit 116, or a combination thereof can be implemented as modules. The modules can be implemented using the control unit 202 of FIG. 2, the storage unit 204 of FIG. 2, the memory interface unit 206 of FIG. 2, the host interface unit 208 of FIG. 2, or a combination thereof.

The storage system 100 is described with module functions or order as an example. The modules can be partitioned differently. Each of the modules can operate individually and independently of the other modules.

Furthermore, data generated in one module can be used by another module without being directly coupled to each other. Yet further, the modules can be implemented as hardware accelerators (not shown) within the control unit 202 or can be implemented as hardware accelerators (not shown) in the main memory controller 104 or outside of the main memory controller 104.

The host interface controller 106 can be coupled to the drive-level control unit 108. The drive-level control unit 108 can be coupled to the memory control unit 116 and the assignment device 312. The assignment device 312 can be coupled to the characterization device 308.

The physical transformation of determining the non-volatile memory device characteristics 306 of the non-volatile memory devices 102 results in movement in the physical world, such as people using the storage devices 302 based on the operation of the storage system 100. As the movement in the physical world occurs, the movement itself creates additional information that is converted back to assigning the non-volatile memory devices 102 to the storage devices 302 and regrouping the non-volatile memory devices 102 based on the operational capabilities 112 that are updated during the runtime operations of the storage devices 302 for the continued operation of the storage system 100 and to continue the movement in the physical world.

It has been found that combining the ability to characterize the non-volatile memory devices 102 during the manufacturing process and also during operations of the storage devices 302 provide improved performance and reliability of the storage devices 302. The improved performance and reliability are provided when the non-volatile memory devices 102 are characterized during the inspection of the non-volatile memory devices 102 and subsequently assigned to the storage devices 302 in the manufacturing process. The improved performance and reliability are provided when the non-volatile memory devices 102 are characterized also during the runtime operations of the storage devices 302 to determine and update the operational capabilities 112.

It has also been found that selecting the non-volatile memory devices 102 based on the predicted use model 314 so that the drives or the storage devices 302 that are different from each other are built for specific applications or purposes.

It has further been found that regrouping the non-volatile memory devices 102 having the non-volatile memory device characteristics 306 that are substantially the same with each other as the storage devices 302 age provide smooth performance and operations over a population of the drives.

It has further been found that continuously regrouping the non-volatile memory devices 102 provide improved aging, endurance, and reliability of the storage devices 302.

It has further been found that determining the average bit error rate associated with the non-volatile memory devices 102 provide improved performance since the average bit error rate is used to determine the performance groups 304. Each of the performance groups 304 has certain performance characteristics used to classify the non-volatile memory devices 102 for making decisions by the assignment device 312 on that classification of how to assemble drives.

Figure 4:
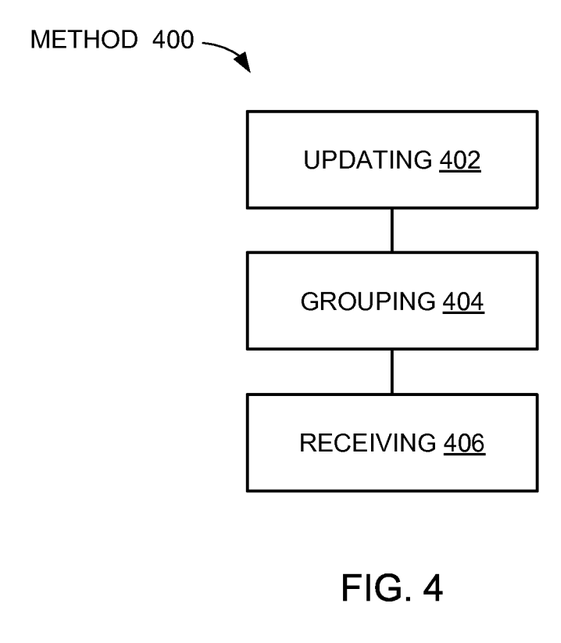
FIG. 4 is a flow chart of a method of data management in a storage system in a further embodiment of the present invention.

Referring now to FIG. 4, therein is shown a flow chart of a method 400 of data management based on non-volatile memory device characteristics determined during an inspection of non-volatile memory devices before a runtime operation of a storage device in a storage system in a further embodiment of the present invention. The method 400 includes: performing by a controller in the storage system: updating operational capabilities based on the non-volatile memory device characteristics during the runtime operation of the storage device in a block 402; grouping the non-volatile memory devices based on the operational capabilities in a block 404; and receiving the operational capabilities for controlling the non-volatile memory devices in a block 406.

Accordingly, it has been discovered that the values of the embodiments described above provide advantages that will go a long way to improving overall capabilities of a product line and reducing the cost of the product line in general. The advantages include improved performance, improved reliability, and improved data integrity of the storage system 100 of FIG. 1. The embodiments are applicable to all SSDs being designed today.

Thus, it has been discovered that the storage system 100 of the present invention furnishes important and heretofore unknown and unavailable solutions, capabilities, and functional aspects for data management in a storage system. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of data management in a data storage system comprising:
    during runtime operation of the data storage system:
        directing runtime operations for a first application to a first grouping of non-volatile memory devices, of a plurality of non-volatile memory devices in the data storage system;
        directing runtime operations for a second application to a second grouping of non-volatile memory devices, of the plurality of non-volatile memory devices in the data storage system, wherein:
            the second application is distinct from the first application and the second grouping is distinct from the first grouping,
            groupings, including the first grouping and the second grouping, of the plurality of non-volatile memory devices are based on device characteristics of the plurality of non-volatile memory devices in the data storage system,
            the device characteristics are indicated by information in a device characteristics table,
            each of the groupings of the plurality of non-volatile memory devices in the data storage system corresponds to a respective class of a set of classes of non-volatile memory usage, wherein the set of classes includes at least two of write mostly accesses, read mostly accesses, large sequential accesses, and highly random accesses,
            each of the plurality of non-volatile memory devices includes erase blocks that each have multiple pages, and
            initial information in the device characteristics table is based on non-volatile memory device characteristics determined during an inspection of the plurality of non-volatile memory devices before the runtime operation of the data storage system;
        updating the information in the device characteristics table to indicate updated device characteristics of respective individual non-volatile memory devices in the plurality of non-volatile memory devices determined during the runtime operation of the data storage system;
        updating the groupings of the plurality of non-volatile memory devices in the data storage system based on the updated device characteristics indicated by the updated information in the device characteristics table; and
        subsequent to updating the groupings, directing runtime operations for the first application to a first updated grouping of non-volatile memory devices, of the plurality of non-volatile memory devices in the data storage system, and directing runtime operations for the second application to a second updated grouping of non-volatile memory devices, of the plurality of non-volatile memory devices in the data storage system, wherein the second updated grouping is distinct from the second grouping and the first updated grouping.

2. The method as claimed in claim 1, further comprising, before the runtime operation on the data storage system, grouping the plurality of non-volatile memory devices, including the first grouping and the second grouping, based on the device characteristics of the non-volatile memory devices indicated by the information in the device characteristics table,
    wherein grouping the plurality of non-volatile memory devices includes grouping non-volatile memory devices that have substantially similar device characteristics.

3. The method as claimed in claim 1, wherein:
    updating the information in the device characteristics table to indicate updated device characteristics includes determining the average bit error rate for each of the non-volatile memory devices in the plurality of non-volatile memory devices, and
    grouping, including the first grouping and the second grouping, the plurality of non-volatile memory devices into said groupings is based at least in part on the determined average bit error rates for the plurality of non-volatile memory devices.

4. The method as claimed in claim 1, wherein grouping the plurality of non-volatile memory devices includes dynamically grouping the non-volatile memory devices based at least in part on one of erase time, write time, and latency.

5. A data storage system, comprising:
    a plurality of non-volatile memory devices; and
    a controller, having one or more processors and one or more modules, configured to, during runtime operation of the data storage system:
        direct runtime operations for a first application to a first grouping of non-volatile memory devices, of the plurality of non-volatile memory devices in the data storage system;
        direct runtime operations for a second application to a second grouping of non-volatile memory devices, of the plurality of non-volatile memory devices in the data storage system, wherein:
            the second application is distinct from the first application and the second grouping is distinct from the first grouping,
            groupings, including the first grouping and the second grouping, of the plurality of non-volatile memory devices are based on device characteristics of the plurality of non-volatile memory devices in the data storage system,
            the device characteristics are indicated by information in a device characteristics table,
            each of the groupings of the plurality of non-volatile memory devices in the data storage system corresponds to a respective class of a set of classes of non-volatile memory usage, wherein the set of classes includes at least two of write mostly accesses, read mostly accesses, large sequential accesses, and highly random accesses,
            each of the non-volatile memory devices includes erase blocks that each have multiple pages, and initial information in the device characteristics table is based on non-volatile memory device characteristics determined during an inspection of the plurality of non-volatile memory devices before the runtime operation of the data storage system;

update the information in the device characteristics table to indicate updated device characteristics of respective individual non-volatile memory devices in the plurality of non-volatile memory devices determined during the runtime operation of the data storage system;

update the groupings of the plurality of non-volatile memory devices in the data storage system based on the updated device characteristics indicated by the updated information in the device characteristics table; and subsequent to updating the groupings, direct runtime operations for the first application to a first updated grouping of non-volatile memory devices, of the plurality of non-volatile memory devices in the data storage system, and directing runtime operations for the second application to a second updated grouping of non-volatile memory devices, of the plurality of non-volatile memory devices in the data storage system, wherein the second updated grouping is distinct from the second grouping and the first updated grouping.

6. The data storage system as claimed in claim 5, further configured to, before the runtime operation on the data storage system, group the plurality of non-volatile memory devices, including the first grouping and the second grouping, based on the device characteristics of the non-volatile memory devices indicated by the information in the device characteristics table, wherein grouping the plurality of non-volatile memory devices includes grouping non-volatile memory devices that have substantially similar device characteristics.

7. The data storage system as claimed in claim 5, wherein:
updating the information in the device characteristics table to indicate updated device characteristics includes determining the average bit error rate for each of the non-volatile memory devices in the plurality of non-volatile memory devices, and grouping, including the first grouping and the second grouping, the plurality of the non-volatile memory devices into said groupings is based at least in part on the determined average bit error rates for the plurality of non-volatile memory devices.

8. The data storage system as claimed in claim 5, wherein grouping the plurality of non-volatile memory devices includes dynamically grouping the non-volatile memory devices based at least in part on one of erase time, write time, and latency.

9. A controller, for a data storage system having a plurality of non-volatile memory devices, the controller comprising one or more processors and one or more modules, configured to, during runtime operation of the data storage system:

direct runtime operations for a first application to a first grouping of non-volatile memory devices, of the plurality of non-volatile memory devices in the data storage system;

direct runtime operations for a second application to a second grouping of non-volatile memory devices, of the plurality of non-volatile memory devices in the data storage system, wherein:

the second application is distinct from the first application and the second grouping is distinct from the first grouping, groupings, including the first grouping and the second grouping, of the plurality of non-volatile memory devices are based on device characteristics of the plurality of non-volatile memory devices in the data storage system, the device characteristics are indicated by information in a device characteristics table, each of the groupings of the plurality of non-volatile memory devices in the data storage system corresponds to a respective class of a set of classes of non-volatile memory usage, wherein the set of classes includes at least two of write mostly accesses, read mostly accesses, large sequential accesses, and highly random accesses, each of the non-volatile memory devices includes erase blocks that each have multiple pages, and initial information in the device characteristics table is based on non-volatile memory device characteristics determined during an inspection of the plurality of non-volatile memory devices before the runtime operation of the data storage system;

update the information in the device characteristics table to indicate updated device characteristics of respective individual non-volatile memory devices in the plurality of non-volatile memory devices determined during the runtime operation of the data storage system;

update the groupings of the plurality of non-volatile memory devices in the data storage system based on the updated device characteristics indicated by the updated information in the device characteristics table; and subsequent to updating the groupings, direct runtime operations for the first application to a first updated grouping of non-volatile memory devices, of the plurality of non-volatile memory devices in the data storage system, and directing runtime operations for the second application to a second updated grouping of non-volatile memory devices, of the plurality of non-volatile memory devices in the data storage system, wherein the second updated grouping is distinct from the second grouping and the first updated grouping.

10. The controller as claimed in claim 9, further comprising instructions causing the controller to group, before the runtime operation on the data storage system, the plurality of non-volatile memory devices, including the first grouping and the second grouping, based on the device characteristics of the non-volatile memory devices indicated by the information in the device characteristics table, wherein grouping the plurality of non-volatile memory device includes grouping non-volatile memory device that have substantially similar device characteristics.

11. The controller as claimed in claim 9, wherein:
updating the information in the device characteristics table to indicate updated device characteristics includes determining the average bit error rate for each of the non-volatile memory devices in the plurality of non-volatile memory devices, and grouping, including the first grouping and the second grouping, the plurality of non-volatile memory devices into said groupings is based at least in part on the determined average bit error rates for the plurality of non-volatile memory devices.

12. The controller as claimed in claim 9, wherein grouping the plurality of non-volatile memory devices includes dynamically grouping the non-volatile memory devices based at least in part on one of erase time, write time, and latency.

\* \* \* \* \*